(12) United States Patent
Jun

(10) Patent No.: US 7,283,595 B2
(45) Date of Patent: Oct. 16, 2007

(54) ULTRA WIDE BAND PULSE TRAIN GENERATOR

(75) Inventor: Si-Bum Jun, Seoul (KR)

(73) Assignee: Samsung Electronics Co., Ltd. (KR)

( * ) Notice: Subject to any disclaimer, the term of this patent is extended or adjusted under 35 U.S.C. 154(b) by 655 days.

(21) Appl. No.: 10/878,699

(22) Filed: Jun. 28, 2004

(65) Prior Publication Data

US 2005/0117658 A1    Jun. 2, 2005

(30) Foreign Application Priority Data

Dec. 1, 2003    (KR)    ...................... 10-2003-0086426

(51) Int. Cl.
*H04L 27/04*    (2006.01)
(52) U.S. Cl. ...................... 375/295; 375/259; 375/260; 375/219; 375/353; 375/355
(58) Field of Classification Search ................. 375/295
See application file for complete search history.

(56) References Cited

U.S. PATENT DOCUMENTS 6,690,741 B1 *    2/2004    Larrick et al. .............. 375/295
7,209,523 B1 *    4/2007    Larrick et al. .............. 375/295

* cited by examiner

*Primary Examiner*—Mohammed Ghayour
*Assistant Examiner*—Sonia J King
(74) *Attorney, Agent, or Firm*—The Farrell Law Firm, P.C.

(57) ABSTRACT

An ultra wide band (UWB) pulse train generator, which includes a trigger signal controller for sequentially outputting n trigger signals for triggering generation of UWB pulse train in accordance with n bit data to be transmitted at a predetermined time period, a latch unit for loading in parallel the n bit data to be transmitted and sequentially toggling the loaded n bit data by one bit whenever the trigger signal is input from the trigger signal controller, and a pulse train generator for generating polarity pulses corresponding to a direction of an edge transition in accordance with toggling on each output signal of the latch unit.

6 Claims, 3 Drawing Sheets

ULTRA WIDE BAND PULSE TRAIN GENERATOR

PRIORITY

This application claims priority to an application entitled "Ultra Wide Band Pulse Train Generator" filed in the Korean Intellectual Property Office on Dec. 1, 2003 and assigned Serial No. 2003-86426, the contents of which is hereby incorporated by reference.

BACKGROUND OF THE INVENTION

1. Field of the Invention

The present invention relates generally to a UWB (Ultra Wide Band) communication method, and more particularly, to a UWB train generator.

2. Description of the Related Art

Conventionally, a UWB wireless communication technique was used only for military affairs under control of the U.S. Department of Defense. Recently, however, UWB has been opened to non-military organizations regulated by the FCC (Federal Communications Commission). Such a UWB wireless communication technique uses wide frequency band of GHz. In addition, as compared with that of wireless LAN (Local Area Network) of IEEE 802.11 or Bluetooth, the UWB technique has a faster high speed transmission and lower power consumption. Accordingly, the UWB wireless communication technique is considered as a core technique in an advanced network field.

In UWB wireless communication, a transmitter requires a UWB pulse train generator for generating UWB pulse train depending on a data to be transmitted. Additionally, in such a UWB pulse train generator, it is preferable to implement the UWB pulse train generator to be easily integrated with a digital SOC (system on chip).

SUMMARY OF THE INVENTION

Accordingly, an object of the present invention is to provide a UWB pulse train generator for generating the UWB pulse train depending on a data to be transmitted.

Another object of the present invention is to provide a UWB pulse train generator that can be easily integrated with a digital SOC (system on chip).

According to a preferred embodiment of the present invention, there is provided a UWB (ultra wide band) pulse train generator comprising: a trigger signal controller for sequentially outputting n trigger signals for triggering generation of UWB pulse train in accordance with n bit data to be transmitted one by one at a predetermined time period; a latch unit for loading in parallel the n bit data to be transmitted and sequentially toggling the loaded n bit data by one bit whenever the trigger signal is input from the trigger signal controller; and a pulse train generator for generating polarity pulses corresponding to the direction of edge transition in accordance with toggling on each output signal of the latch unit.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Preferred embodiments of the present invention will be described in detail herein below with reference to the accompanying drawings. In the following description of the present invention, a detailed description of known functions and configurations incorporated herein will be omitted when it may obscure the subject matter of the present invention.

Figure 1:
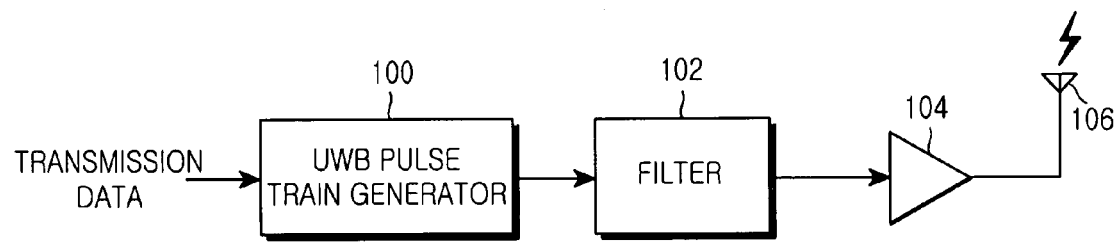
FIG. 1 is a block diagram illustrating a UWB transmitter.

Referring to FIG. 1, which illustrates each block of a UWB transmitter, a UWB pulse train generator 100 inputs data to be transmitted and generates a UWB pulse train in accordance with the input transmission data. The generated UWB pulse train is waveform shaped by a filter 102 and then, wirelessly transmitted through an antenna after being amplified by an amplifier 104.

Figure 2:
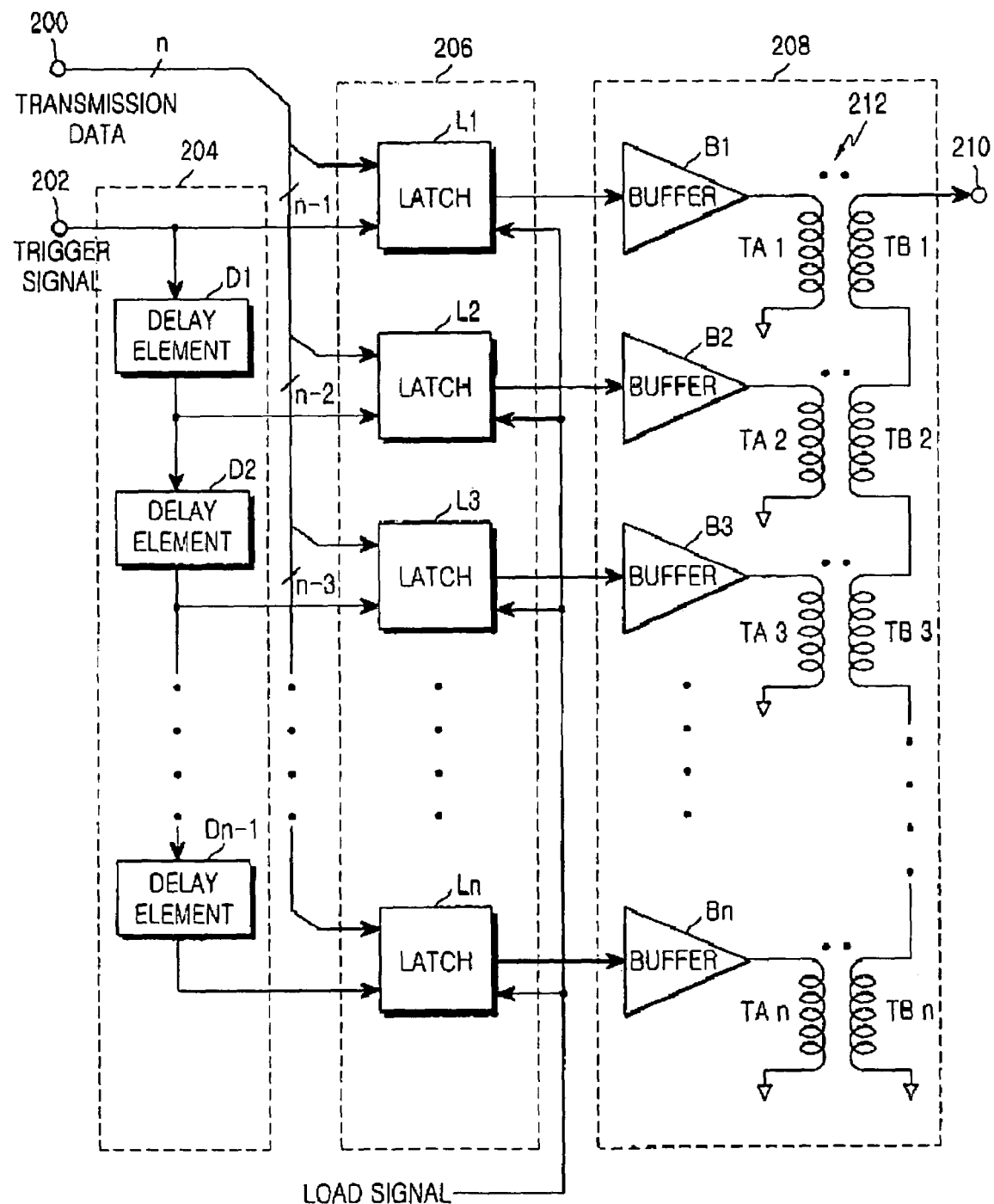
FIG. 2 illustrates a UWB pulse train generator in accordance with a preferred embodiment of the present invention.

FIG. 2 illustrates a UWB pulse train generator in accordance with a preferred embodiment of the present invention. Referring to FIG. 2, the UWB pulse train generator comprises a trigger signal controller 204, a latch unit 206, and a pulse train generator 208. In the UWB pulse train generator, n bit data to be transmitted is input to the latch unit 206 through a data input terminal 200 and a trigger signal for triggering generation of the UWB pulse train in accordance with the n bit data is input to the trigger signal controller 204 through a trigger signal input terminal 202. The UWB pulse train generated by the pulse train generator 208 is output through a pulse train output terminal 210. Herein, it is possible to connect the pulse train output terminal 210 to the filter 102 illustrated in FIG. 1.

The latch unit 206 is comprised of a plurality of latches L1 to Ln and the n bit data received through the data input terminal 200 is loaded in parallel. The latches L1 to Ln load each input data bit in accordance with a load signal and use a latch circuit, which is reversely outputting the loaded data bit in accordance with clock signal. Therefore, the latches L1 to Ln load the n bit data to be matched respectively by one bit in accordance with the load signal.

Figure 3:
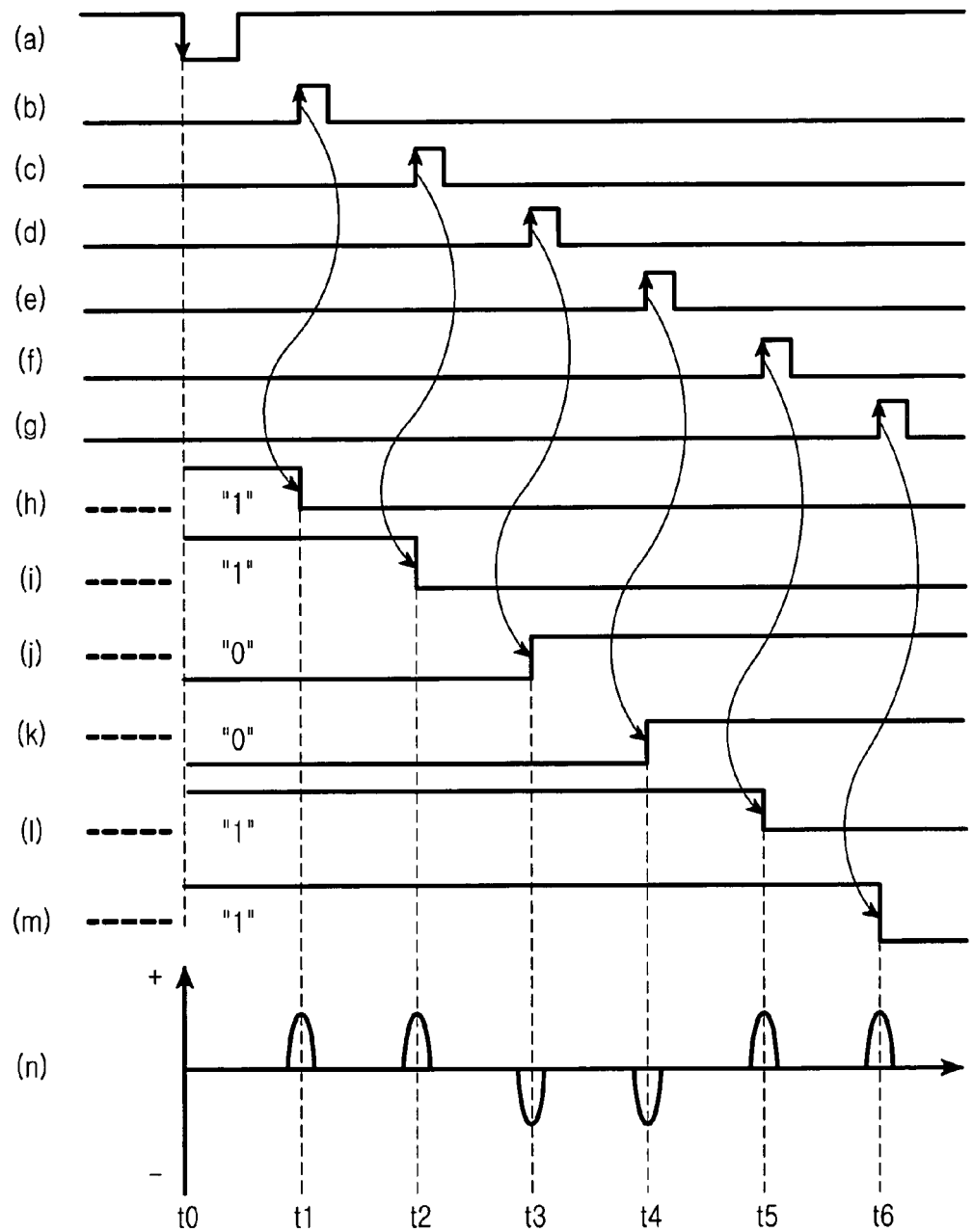
FIG. 3 illustrates wave forms of an operation on each block illustrated in FIG. 2.

Further, if the n bit data to be transmitted is loaded on the latches L1 to Ln then, a trigger signal, as illustrated in FIG. 3, line (b), for triggering the generation of UWB pulse train in accordance with the n bit data loaded on the latches L1 to Ln is input to the trigger signal input terminal 202. The trigger signal input terminal 202 is connected to a trigger signal controller 204 consisting of a plurality of delay elements D1 to Dn-1, which are cascade connected from the trigger signal input terminal 202. The trigger signal controller 204 sequentially delays the trigger signal received through the trigger signal input terminal 202 in accordance with the delay elements D1 to Dn-1 at regular time intervals and then, outputs n trigger signals to the latch unit 206 one by one at regular time intervals. Herein, the regular time interval refers to the delayed time interval for each delay element D1 to Dn1.

As described above, the latch unit 206 receiving trigger signals sequentially output from the trigger signal controller 204 at regular time intervals sequentially toggles n bit data loaded on the latches L1 to Ln by one bit at a time whenever the trigger signal is input from the trigger signal controller 204 and then outputs the same to the pulse train generator 208. Herein, the latches L1 to Ln of the latch unit 206 toggles the loaded data bit to be matched to trigger signals sequentially output from the trigger signal controller 204, and then outputs the toggled ones to the pulse train generator 208.

The pulse train generator 208 receiving output signals toggled by the latch unit 206 generates polarity pulses corresponding to the direction of edge transition in accordance with toggling on each output signal of the latch unit 206 and outputs to the pulse train output terminal 210. In the pulse train generator 208, each output terminal of the latches L1 to Ln of the latch unit 206 is connected to differential current buffers B1 to Bn to be matched one by one. The primary coils TA1 to TAn of the transformer 212 having n pair of primary and secondary coils (TA1, TB1, TA2, TB2, . . . TAn, TBn) are connected between the output of the differential current buffers B1 to Bn and reference potential to be matched one by one. The secondary coils TB1 to TBn of the transformer 212 are serially connected between the pulse train output terminal 210 and the reference potential.

Herein, differential current buffers B1 to Bn utilize a circuit for generating a differential current of $$\frac{di}{dt}$$

in response to an edge of an input signal.

Accordingly, the differential current buffers B1 to Bn generate differential current corresponding to the direction of the edge transition in accordance with toggling on each output signal of the latches L1 to Ln. For example, when the output signals of the latches L1 to Ln are toggled to generate a falling edge signal, the differential current buffers B1 to Bn generate current flowing toward the transformer 212. However, when the output signals of the latches L1 to Ln are toggled to generate a rising edge signal, the differential current buffers B1 to Bn generate current flowing out of the transformer 212. Therefore, the voltage is induced to the secondary coils TB1 to TBn of the transformer 212 by the current sequentially generated from the differential current buffers B1 to Bn. Herein, the secondary coils TB1 to TBn of the transformer 212 are serially connected to the pulse train output terminal 210. As a result, when a mutual inductance of the transformer is M and an output voltage is Vout, the voltage according to Equation 1 is induced to the secondary coils TB1 to TBn depending on the n bit data to be transmitted.

$$V_{out} = \sum_{j=1}^{n} M \frac{di_j}{dt}$$ Equation 1

More specifically, whenever a trigger signal is sequentially generated from the trigger signal controller 204 at regular time intervals, the voltage pulses corresponding to bits of n bit data to be transmitted are sequentially output to the pulse train output terminal 210 connected to the secondary coils TB1 to TBn of the transformer 212. Therefore, the pulses output to the pulse train output terminal 210 form the UWB pulse train.

As stated above, FIG. 3 illustrates wave forms for operations on each block of the UWB pulse generator in accordance with a preferred embodiment of the present invention. In FIG. 3, the transmission data is 6 bits, i.e., n=6 and "110011". Accordingly, five delay elements of the trigger signal controller 204, six latches of the latch unit 206, six differential current buffers, and six pair of coils of the transformer 212 of the pulse train generator 208 are required. In this regard, it should be noted that the five delay elements refer to "L1 to L5", the six latches refer to "L1 to L6", the six differential current buffers refer to "B1 to B6", and the six pairs of coils of the transformer 212 refer to "TA1, TB1, TA2, TB2 . . . TA6, TB6".

Herein below, referring to FIG. 3, a detailed description for the operation of the UWB pulse train generator illustrated in FIG. 2 will be given by way of an example. As illustrated in FIG. 3, lines (h) to (m), the latches L1 to L6 of the latch unit 206 load 6 bit data "110011" received through the data input terminal 200 at the time of t0 to be matched by one bit in accordance with a load signal illustrated in FIG. 3, line (a).

If the trigger signal with a rising edge is generated at the time t1, as illustrated in FIG. 3, line (b), is input to the trigger signal input terminal 202, the trigger signal controller 204 passes the input trigger signal and outputs to the latch L1. Thereafter, the latch L1 toggles the loaded input data bit "1" to be "0" at the time of t1 in accordance with the trigger signal on line (b). In addition, the trigger signal with the rising edge is generated at the time of t1 as illustrated in line (b) is input to the delay element D1 to be delayed for a predetermined time period.

As illustrated in FIG. 3, line (c), the trigger signal with the rising edge generated at the time t2 is output to the latch L2. The latch L2 toggles the loaded input data bit "1" to be "0" at the time t2 in accordance with the trigger signal in line (c). The signal delayed by the delay element D1 is again input to the delay element D2 to pass through the delay elements D2 to D5. Accordingly, in the delayed elements D2 to D5, the trigger signals shown in FIG. 3, lines (d), (e), (f), and (g) are sequentially output to the latches L3 to L6 at the times t3, t4, t5, and t6, respectively. The latches L3 to L6 toggle the loaded input data bits "0", "0", "1", and "1", to be "1", "1", "0", and "0" at the time t3, t4, t5, and t6 in accordance with trigger signals illustrated in lines (d), (e), (f), and (g), respectively.

As illustrated in FIG. 3, lines (h) to (m), in the differential current buffers B1 to B6, differential current is generated in the direction corresponding to an edge of an input signal toggled at a time t1 to t6. Therefore, in the secondary coils TB1 to TB6 of the transformer 212, as illustrated in FIG. 3, line (n), a polarity voltage pulse corresponding to the direction of the current respectively produced by the differential current buffers B1 to B6 at time t1 to t6 is generated. The generated pulse illustrated in line (n) is output to the pulse train output terminal 210 as a UWB pulse train in accordance with bits of 6 bit data "110011" to be transmitted.

As a result, it is possible to generate the UWB pulse train in accordance with transmission data. Additionally, data bits to be transmitted are sequentially toggled and the UWB pulse train is generated using the differential wave form. Further, the construction is relatively simple and power consumption is reduced.

In addition, because the trigger signal controller 204 and the latch unit 206 are comprised of digital elements, the present invention can be easily integrated with the digital SOC (system on chip) in the future. Additionally, according to another embodiment of the present invention, the compact transformer 212 is constructed using an embedded PCB (printed circuit board) technology.

As described above, the present invention has an advantage in that the data bits to be transmitted are toggled and a UWB pulse train is generated using the differential wave form to thereby simplify its construction and reduce power consumption. Further, to the present invention will easily integrate with the digital SOC in the future.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. An ultra wide band (UWB) pulse train generator for generating an UWB pulse train in accordance with data to be transmitted, the apparatus comprising:
    a data input terminal for receiving n bit data to be transmitted;
    a trigger signal input terminal for receiving a trigger signal for triggering generation of a UWB pulse train in accordance with the n bit data;
    a pulse train output terminal for outputting the generated UWB pulse train;
    a trigger signal controller for sequentially outputting n trigger signals input through the trigger signal input terminal at regular time intervals;
    a latch unit for loading in parallel the n bit data input through the data input terminal and sequentially toggling the loaded n bit data by one bit whenever the trigger signal is input from the trigger signal controller; and
    a pulse train generator for generating polarity pulses corresponding to a direction of an edge transition in accordance with the toggling on each output signal of the latch unit and outputting the polarity pulses to the pulse train output terminal.

2. The apparatus as claimed in claim 1, wherein the trigger signal controller, which includes a plurality of delay elements, is cascade connected from the trigger signal input terminal and for outputting n trigger signals.

3. The apparatus as claimed in claim 2, wherein the latch unit comprises a plurality of latches for loading the n bit data to be transmitted to be matched by one bit and for toggling the loaded data bit to be matched to the trigger signals sequentially output from the trigger signal controller.

4. The apparatus as claimed in claim 3, wherein the pulse train generator comprises:
    differential current buffers connected to output terminals of the latches to be matched one by one, for generating differential current corresponding to the direction of the edge transition in accordance with the toggling on each of the output signals of the latches; and
    a transformer having n pair of primary and secondary coils, wherein the primary coils are connected between the output terminal of the differential current buffer and a ground, and the secondary coils are serially connected between the pulse train output terminal and a ground.

5. The apparatus as claimed in claim 1, wherein the latch unit comprises a plurality of latches for loading the n bit data to be transmitted to be matched by one bit and for toggling the loaded data bit to be matched to the trigger signals sequentially output from the trigger signal controller.

6. The apparatus as claimed in claim 5, wherein the pulse train generator comprises:
    differential current buffers connected to output terminals of the latches to be matched one by one, for generating differential current corresponding to the direction of the edge transition in accordance with the toggling on each of the output signals of the latches; and
    a transformer having n pair of primary and secondary coils, wherein the primary coils are connected between the output terminal of the differential current buffer and a ground, and the secondary coils are serially connected between the pulse train output terminal and a ground.

* * * * *